June 30, 1936. J. LAWSON ET AL Re. 20,025

MACHINE FOR KNITTING FABRIC

Original Filed Jan. 8, 1929 5 Sheets-Sheet 1

Inventors:
John Lawson,
Robert H. Lawson,
by Emery, Booth, Janney and Varney
Attys.

June 30, 1936. J. LAWSON ET AL Re. 20,025

MACHINE FOR KNITTING FABRIC

Original Filed Jan. 8, 1929 5 Sheets-Sheet 2

Inventors:
John Lawson.
Robert H. Lawson,
by Emery, Booth, Jarvis and Varney,
Attys June 30, 1936.

J. LAWSON ET AL

Re. 20,025

MACHINE FOR KNITTING FABRIC

Original Filed Jan. 8, 1929

5 Sheets-Sheet 3

Inventors
John Lawson.
Robert H. Lawson.
by Emery, Booth, Janney and Varney
Attys June 30, 1936. J. LAWSON ET AL Re. 20,025
MACHINE FOR KNITTING FABRIC
Original Filed Jan. 8, 1929 5 Sheets-Sheet 4
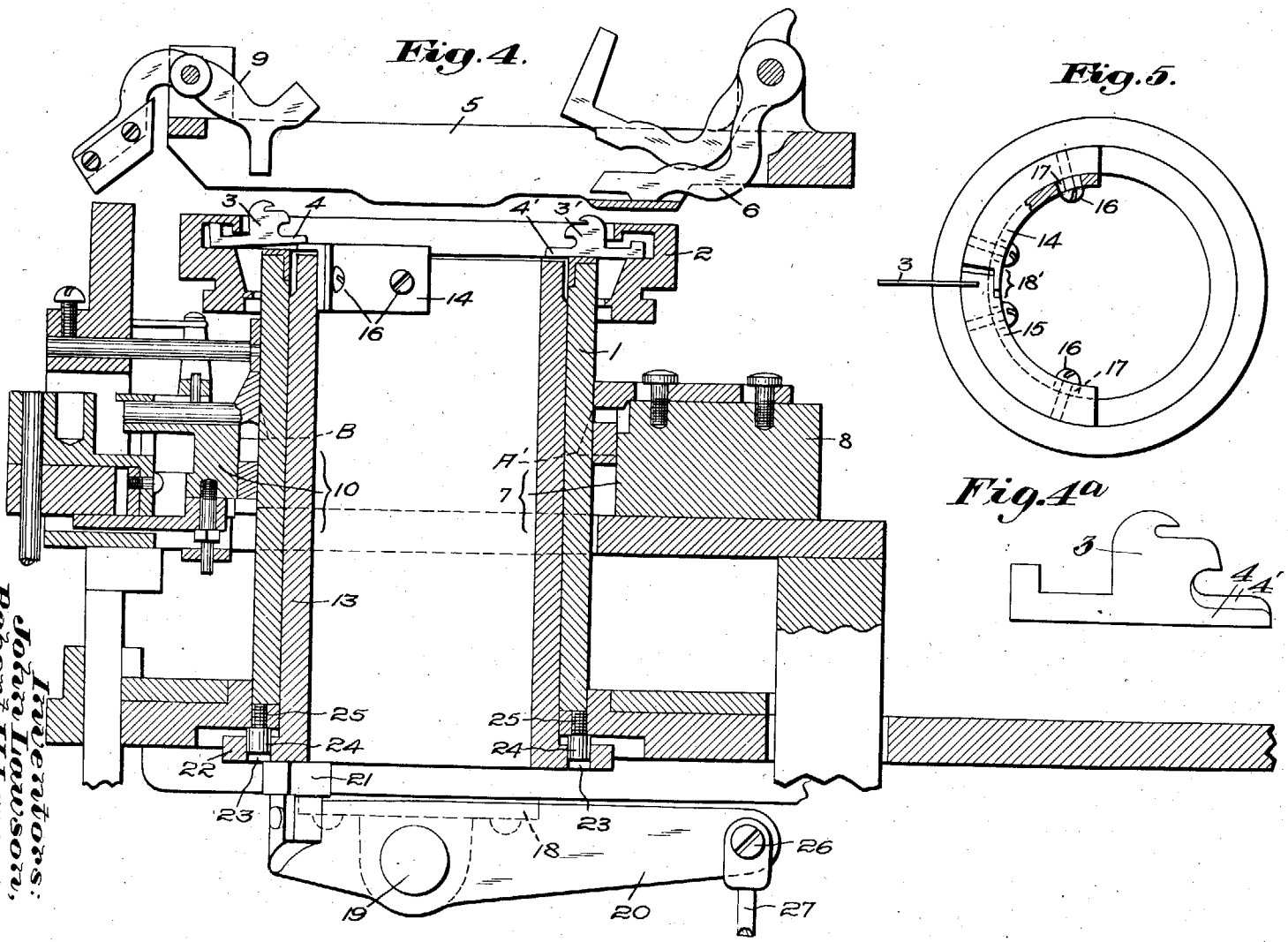
Inventors:
John Lawson,
Robert H. Lawson,
by Emery, Booth, Janney & Varney Attys

MACHINE FOR KNITTING FABRIC

Original Filed Jan. 8, 1929 5 Sheets-Sheet 5

Inventors:
John Lawson,
Robert H. Lawson,
by Emery, Booth, Janney and Varney
Attys.

Reissued June 30, 1936 Re. 20,025

UNITED STATES PATENT OFFICE 20,025

MACHINE FOR KNITTING FABRIC

John Lawson, Bristol, and Robert H. Lawson, Pawtucket, R. I., assignors to Hemphill Company, Central Falls, R. I., a corporation of Massachusetts Original No. 1,862,021, dated June 7, 1932, Serial No. 330,996, January 8, 1929. Application for reissue June 1, 1934, Serial No. 728,628

12 Claims. (Cl. 66—43)

This invention relates to mechanism for knitting fabric.

In order that the principle of the invention may be readily understood, we have disclosed a single embodiment thereof in the accompanying drawings, wherein—

Fig. 4 is a vertical central section taken through the head of the machine;

Figure 6:
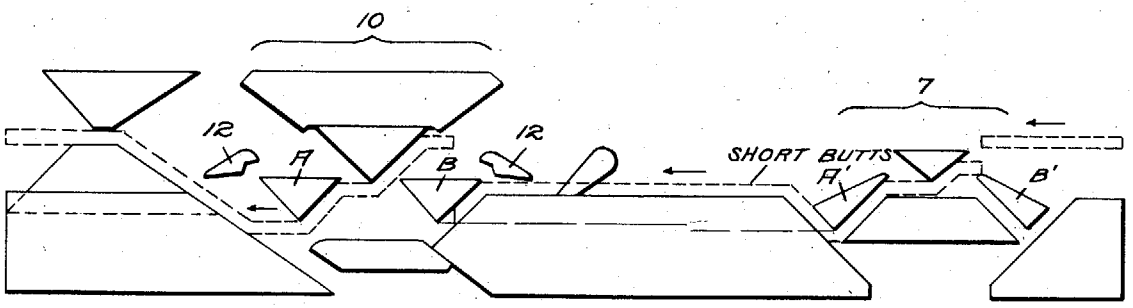
Figure 7:
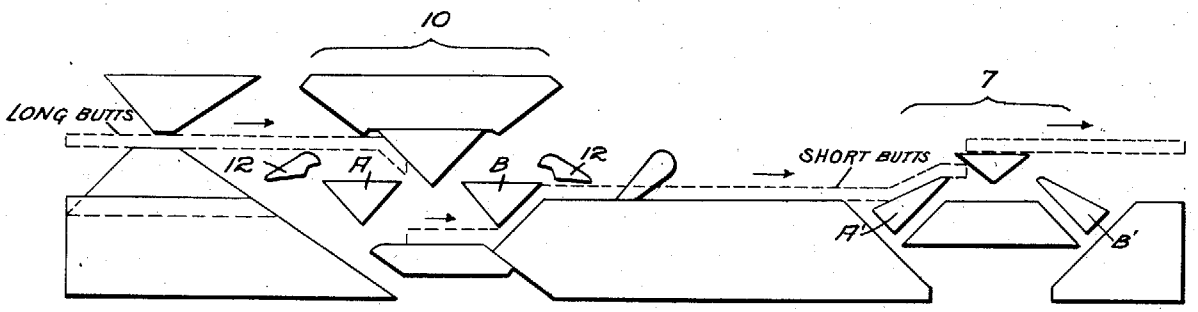

In Fig. 4*a*, we have represented, upon an enlarged scale, in an approximate manner, the relative sizes of the sinkers or web holders that knit at the two sides;

Fig. 5 is a plan view of the upper end of the needle cylinder and the partial sleeve for acting upon certain of the sinkers or web holders; and Figs. 6 and 7 are somewhat diagrammatic views of the inside of the cam ring, to show in development the primary and auxiliary knitting cams.

This invention is applicable to different types of circular knitting machines for knitting split fabric. We have, however, chosen to represent the same as embodied in or applied to a circular knitting machine of the type shown in the patent to Augustin Gagne, No. 1,673,764, dated June 12, 1928, and to which patent we hereby refer for a complete disclosure of those parts of the mechanism with which our present invention is not particularly concerned or which are not modified by our present invention.

An important purpose of our invention is to effect the equalization in size of the knitted loops upon the two portions of the fabric, namely, the portion knitted at the primary set of knitting cams and the portion knitted at the auxiliary set of knitting cams. In the formation of split work or split fabric upon the main types of circular knitting machines, and, for example, upon that disclosed in said patent to Gagne, No. 1,673,764, the short butt needles knit at the primary set of knitting cams, and the long butt needles knit at the auxiliary set of knitting cams. At the auxiliary set of knitting cams, the short butt needles pass, without knitting, under certain of the knitting cams of the auxiliary set, as will be evident from an inspection of Fig. 6 hereof, and the result is a tendency unduly to lengthen the loops or stitches that were knitted upon the short butt needles at the primary set of knitting cams by the passing of said short butt needles under the referred to cam or cams at the auxiliary set of knitting cams.

At said auxiliary set of knitting cams, the said short butt needles, being again moved downward, tend to strain their loops and weaken or somewhat enlarge the same, so that said loops are not wholly uniform with the loops formed upon the long butt needles. Our present invention is concerned with means for overcoming this difficulty, and accordingly we will not describe at length the means for forming split work fabric, since that is fully disclosed in said patent to Gagne, No. 1,673,764, to which we have chosen to represent our invention as applied, without, however, limiting it to use on or with such mechanism.

Figure 2:
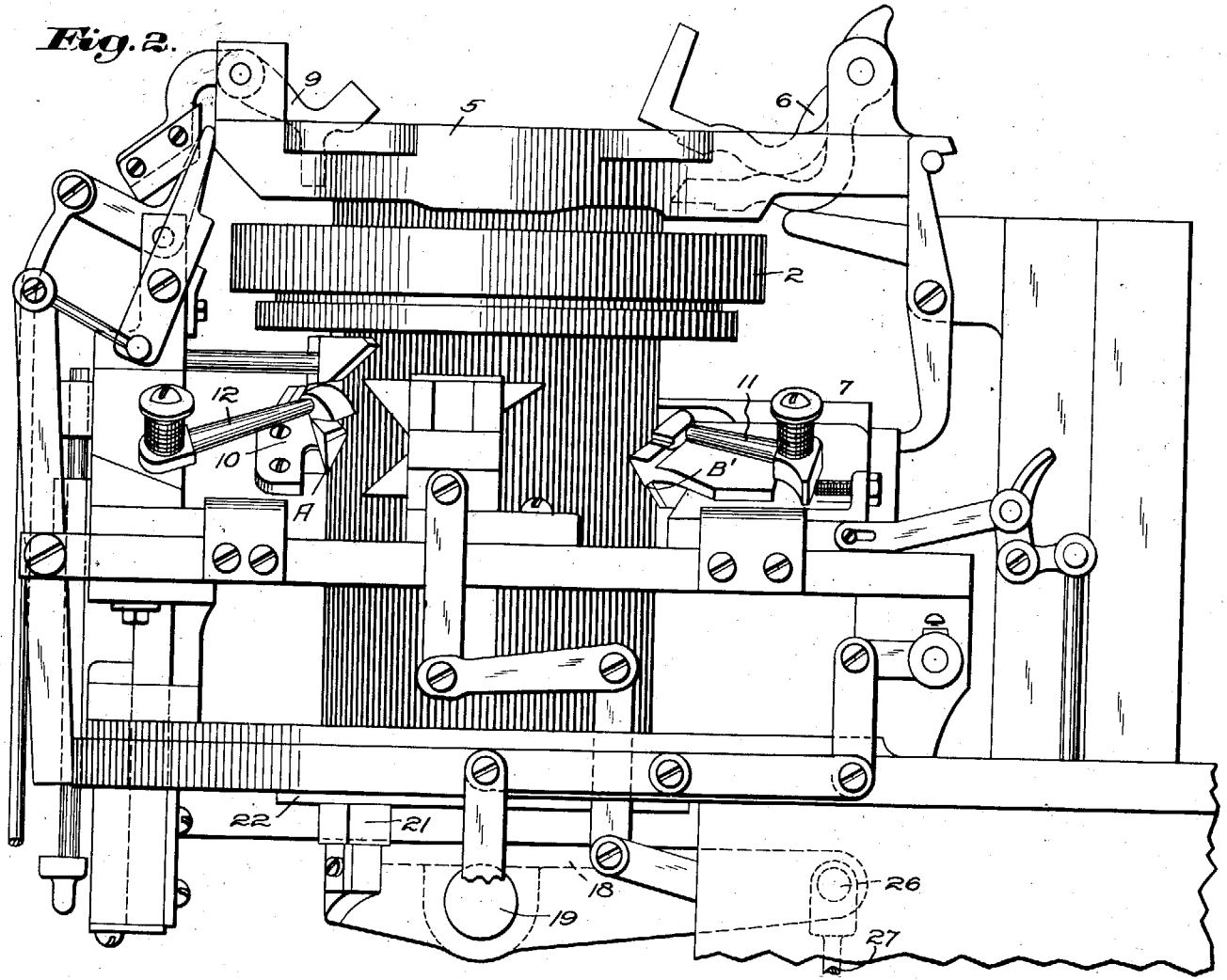
Fig. 2 is a front elevation upon an enlarged scale of the upper or head part only of the knitting machine shown in Fig. 1.
Figure 3:
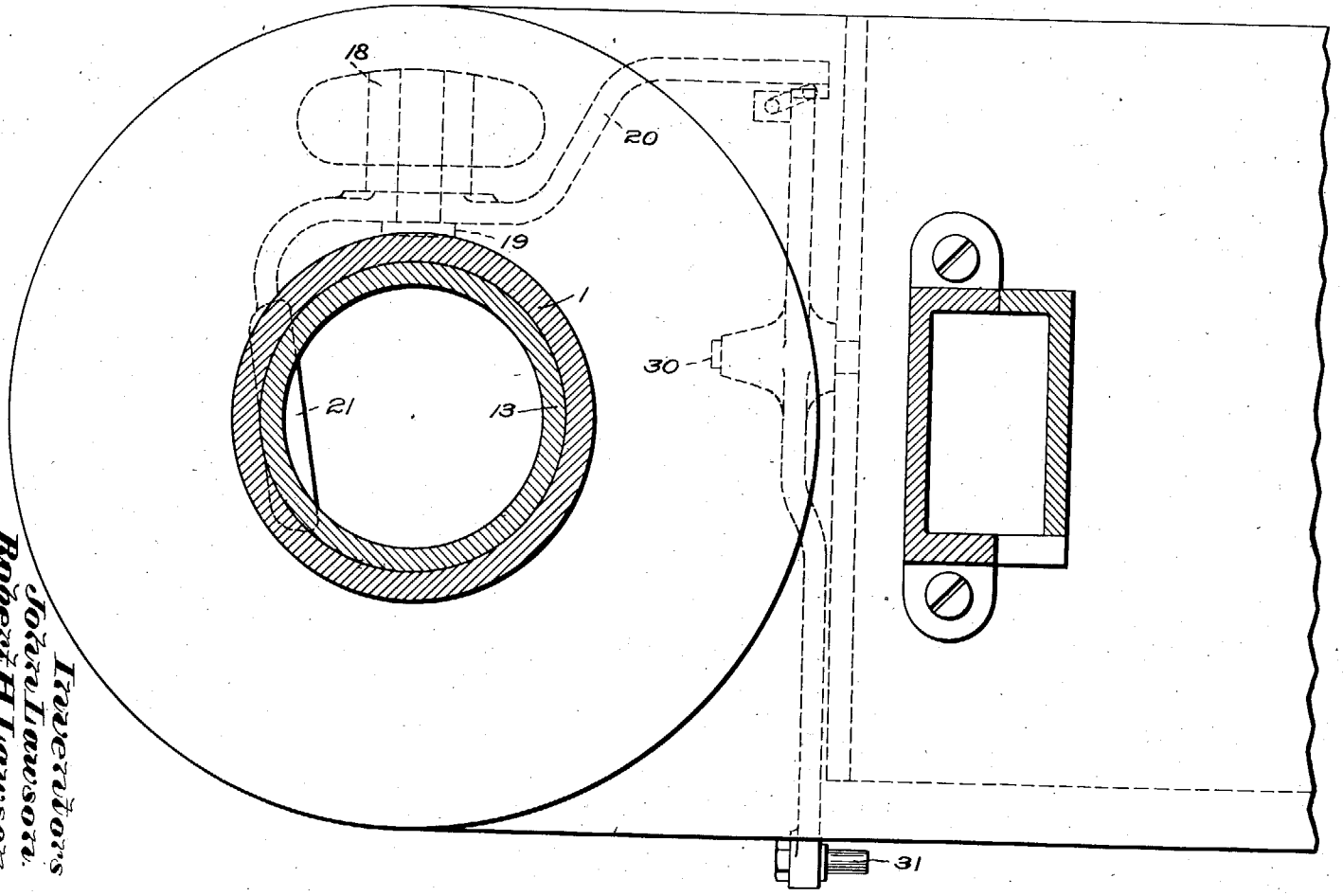
Fig. 3 is a horizontal section upon the line 3—3 of Fig. 1 looking downward in said figure.

The machine shown is of the Banner type as modified to effect the formation of split work. It is provided with a needle cylinder 1, which preferably employs latch needles, though our invention is not limited to that type of needle. The sinker cam ring is indicated at 2, and the sinkers are generally indicated at 3. Those for the long butt needles are, however, provided with forwardly extended guiding ends 4 which are slightly less in vertical extent than are the corresponding parts 4' of the sinkers 3' for the short butt needles, for a reason to be stated hereinafter. The latch ring 5 is provided at one side with the series of yarn fingers 6 which overlie the primary set of knitting cams 7 (see Figs. 6 and 7) carried by a block 8. Said latch ring is provided at the opposite side preferably with a single yarn finger 9 positioned above the auxiliary set of knitting cams indicated at 10 in Figs. 6 and 7, and shown in section in Fig. 4. The said yarn fingers at the main and auxiliary sides are adapted to be controlled and operated in the manner fully described in said Gagne patent, and in cooperation therewith pickers are employed generally indicated at 11 and 12 in Fig. 2.

In order to equalize the loops at the two sides or portions of the split work fabric, we may provide any suitable means, and inasmuch as we believe ourselves to be the first to effect such equalization, we desire to claim the same broadly. As the specific means for effecting such equalization, we have provided the following mechanism constituting the best means now known to us for carrying our invention into effect.

Within the needle cylinder 1 we position the sleeve 13, which fits said needle cylinder relatively tightly but loosely enough to permit the ready slight axial movement which is imparted thereto at the commencement and at the termination of the split work. The said sleeve, at the top, is provided with two plates 14, 15 curved to be concentric with the inner face of the sleeve 13 and secured thereto by screws 16 passing through elongated horizontal slots 17, whereby the said plates may be moved slightly toward or from each other, thereby exactly conforming in circumferential extent with the entire series of long butt needles and their sinkers. While, therefore, the circumferential extent of said two plates 14, 15 may be varied to suit different types of machines, they are here shown as together occupying 180 degrees of the needle cylinder, as clearly appears from Fig. 5. At their meeting ends, said two plates have an interengaging formation 18', shown in Fig. 5.

The purpose of the invention is to move the sleeve 13 slightly upwardly at the very commencement of the split work and to restore the same to its normal or lower position precisely at the end thereof. As shown in Fig. 4*a* the vertical extent of the guiding ends 4 of the long butt sinkers (that is, the sinkers for the long butt needles) is decreased slightly with respect to the vertical extent of the sinkers 4' by removing metal desirably from the top of the guiding ends 4. The decrease in the vertical extent of the guiding ends 4 is for the purpose of permitting such sinkers to be elevated in the manner hereinbefore described, this being necessary in view of the usual sinker ring overlying the guiding ends 4 (not shown) an example of which is shown in the patent to Hemphill 1,015,733, January 23, 1912. These two factors thus afford a practical manner of or means for effecting just the desired upward movement of the sinkers for the long butt needles, so that while the loops are being drawn over the sinkers for the long butt needles, said sinkers are slightly elevated, and, as herein shown, this elevation is effected through the upward rocking movement thereof. The relative sizes of the sinkers or web holders for the two sets of needles are approximately indicated in Fig. 4*a*.

Referring again to Fig. 6 and comparing the height of the cams A, B at the auxiliary side with the height of the corresponding cams A', B' at the primary side, it will be seen that the lowermost points or portions of the cams A and B are at a slightly higher level than the corresponding points or portions of the cams A', B'. The difference in level is in fact very slight, and in practice is substantially or about one sixteenth of an inch. The difference, however, is an exact one or substantially exact, and may be expressed in hundredths of an inch, but the statement that the difference is about one sixteenth of an inch approximately indicates the difference in levels for the purpose of explaining the invention.

Customarily a heavier yarn is knitted in at the primary side than at the auxiliary side. We have discovered that in such case heretofore, said heavier yarn is strained at the auxiliary side when the butts of the short butt needles pass under the auxiliary cams. To overcome such objection, we have, as stated, positioned the cams A and B at a slightly higher level from the corresponding points or portions of the cams A', B'.

It will be understood, therefore, that the short butt needles at the primary set of knitting cams are drawn downward to a lower level by the cams A', B', or either of them than any of the needles are drawn down by the cams A, B. In order, therefore, to effect the equalization of the loops upon the two sides, the sleeve 13 is provided which, at the auxiliary side, rocks the sinkers for the long butt needles only, so as to lengthen the loops formed upon the long butt needles and thus equalize them in length with the loops formed upon the short butt needles.

Inasmuch as the long butt needles must, in the knitting, pass under the cams A and B, it is evident that, having elevated said cams A and B slightly for the reasons stated, the long butt needles will not be drawn down far enough by the cams A and B to make their loops as long as the loops formed upon the short butt needles. It is for this reason that we provide means for moving the sinkers or web holders at the auxiliary knitting cam side of the machine, so as thus to lengthen the loops formed upon the long butt needles and make them exactly the same in length as the loops formed upon the short butt needles at the primary knitting cam side of the machine.

In order to move the cylinder or sleeve 13 upwardly to the slight extent desired simultaneously with the commencement of the split work and to lower the same simultaneously with the completion thereof, we provide any suitable means. For the purpose, the following means is preferably provided, to which, however, our invention is in no wise limited.

Figure 1:
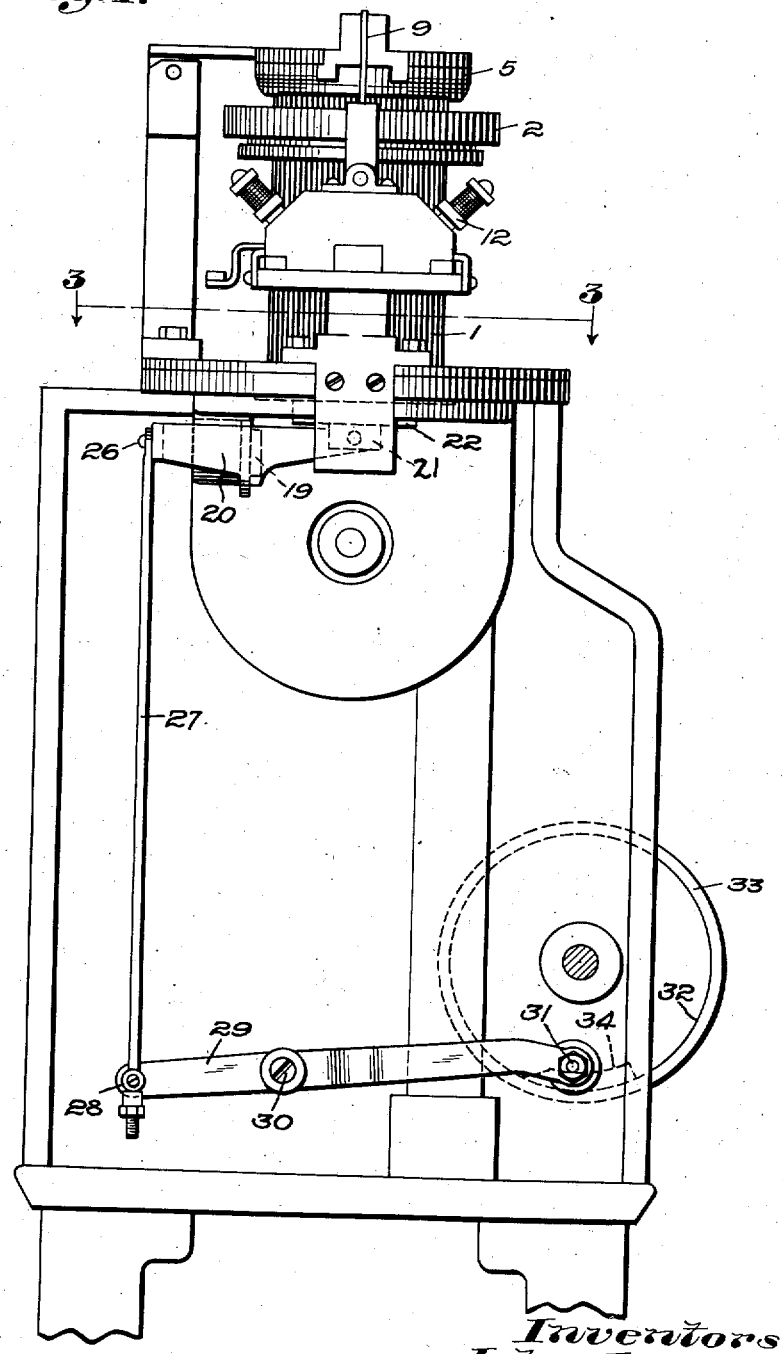
Fig. 1 is a left hand end elevation of a circular knitting machine constructed in accordance with our invention.

Upon a bracket, indicated at 18 secured to the under side of the bed plate, is mounted a pivotal pin 19 upon which is axially mounted a horizontal lever 20 having one end 21 extending under the flanged lower end 22 of the sleeve 13. Desirably said flange 22 is provided with vertical openings 23 receiving the guiding heads 24 of pins or screws 25 tapped into the lower end of the needle cylinder. To the outer end of the lever 20, there is pivoted at 26 a vertical rod 27 extending downwardly, as indicated most clearly in Fig. 1, and adjustably connected at 28 to the outer end of a lever 29 pivoted at 30 and having at its opposite end a pin 31 riding upon the inner surface 32 of the main pattern drum 33. Said inner surface is provided with a cam 34 which is of the length, proportion and shape desired to impart the vertical movements to the sleeve 13 at the desired time. The movements of the sleeve 13 are therefore automatically controlled from the pattern drum of the machine.

It is to be understood that, within the scope and purpose of the invention, any suitable means may be employed to equalize the loops or stitches at the two portions of the fabric and that in accordance with our invention we prevent undue strain upon the loops or stitches formed at the primary knitting cam side of the machine.

Having thus described one illustrative embodiment of the invention, it is to be understood that although specific terms are employed, they are used in a generic and descriptive sense, and not for purposes of limitation, the scope of the invention being set forth in the following claims.

We claim:

1. Mechanism for knitting so-called split fabric having opposite suture seams upon a circular knitting machine including a primary set of knitting cams, an auxiliary set of knitting cams, the lowermost of the knitting cams at the auxiliary side being slightly higher than the level of the bottom of the corresponding cams at the primary side, whereby over strain is prevented of loops or stitches formed at the primary knitting side.

2. Mechanism for knitting so-called split fabric having opposite suture seams upon a circular knitting machine including a primary set of knitting cams, an auxiliary set of knitting cams, and means to elevate slightly during the knitting operation the sinkers at the auxiliary side.

3. Mechanism for knitting so-called split fabric having opposite suture seams upon a circular knitting machine including a primary set of knitting cams, an auxiliary set of knitting cams for respectively knitting the opposing parts of the said fabric, the lowermost of the knitting cams at the auxiliary side being slightly higher than the level of the bottom of the corresponding cams at the primary side, and means to elevate slightly at the auxiliary side the sinkers or web holders during the knitting operation of said fabric.

4. Mechanism for knitting so-called split fabric having opposite suture seams upon a circular knitting machine including a primary set of knitting cams, an auxiliary set of knitting cams, the drawing down cams on the auxiliary side being positioned at a very slightly higher level than the corresponding cams at the primary knitting side, and means whereby the sinkers at the auxiliary side are moved so as slightly to enlarge the loops formed at the auxiliary side.

5. Mechanism for knitting so-called split fabric having opposite suture seams upon a circular knitting machine including a primary set of knitting cams, an auxiliary set of knitting cams, a sleeve concentric with the knitting cylinder and having provisions for engaging sinkers at the auxiliary side to move the same upwardly, and means to move said sleeve upwardly at the commencement of split work, and to depress the same at the termination of split work.

6. Mechanism for knitting so-called split fabric having opposite suture seams upon a circular knitting machine including a primary set of knitting cams, an auxiliary set of knitting cams, a sleeve concentric with the knitting cylinder and having provisions for engaging sinkers at the auxiliary side to move the same upwardly, and automatically controlled means to move said sleeve upwardly at the commencement of split work, and to depress the same at the termination of split work.

7. Mechanism for knitting so-called split fabric having opposite suture seams upon a circular knitting machine including a primary set of knitting cams, an auxiliary set of knitting cams, sinkers for the needles respectively, the sinkers at the auxiliary side below the part over which the yarn or thread is drawn being of very slightly less vertical extent than the corresponding formations at the primary knitting side, and means to elevate slightly for and during split work the sinkers at the auxiliary side.

8. A split-foot knitting machine having needles and two sets of knitting cams, the cams of one of said sets being adapted to draw longer stitches than the cams of the other set, and means cooperating with the needles knitting at the said other set of cams for increasing the length of the stitches drawn by said other set of cams whereby the stitches knitted at the two sets of cams are substantially of the same length.

9. A split-foot knitting machine having needles and two sets of knitting cams, the cams of one of said sets being adapted to draw longer stitches than the cams of the other set, and sinkers cooperating with the needles knitting at the said other set of cams and adapted to be moved to increase the length of the stitches drawn by said other set of cams whereby the stitches knitted at the two sets of cams are substantially of the same length.

10. A split-foot knitting machine having independent needles and cams for imparting stitch drawing movements thereto, one said cam being positioned to draw longer stitches than the other cam, and means acting in cooperation with the needles to cause the needles to knit stitches of substantially the same length when acted upon by one cam as when acted upon by the other.

11. A circular knitting machine including a needle cylinder; a series of independent needles carried by the needle cylinder; means for feeding yarn to the needles; a series of cams arranged to produce lengthwise movements of needles during relative movements of the needle cylinder and a feed point, said series of cams including stitch cams arranged to lower needles to draw stitches when relative movement in one direction occurs and arranged to lower needles to draw stitches when relative movement in the opposite direction occurs; sinkers associated with the needles; and means for adjustably changing the level of sinkers associated with needles where those needles form stitches by being lowered by at least one of said stitch cams, whereby the stitches formed during relative movements in opposite directions may be balanced irrespective of differences in depressions of needles effected by the stitch cams.

12. A circular knitting machine including a needle cylinder; a series of independent needles carried by the needle cylinder; means for feeding yarn to the needles; a series of cams arranged to produce lengthwise movements of needles during relative movements of the needle cylinder and a feed point, said series of cams including stitch cams arranged to lower needles to draw stitches when relative movement in one direction occurs and to lower needles to draw stitches when relative movement in the opposite direction occurs; means for relatively axially moving the needle cylinder and cams to adjust the amount of depression of needles by the stitch cams; sinkers associated with the needles; and means for adjustably changing the level of sinkers associated with needles where those needles form stitches by being lowered by at least one of said stitch cams, whereby the stitches formed during relative movements in opposite directions may be balanced irrespective of differences in depressions of needles effected by the stitch cams.

JOHN LAWSON.
ROBERT H. LAWSON.